US012490037B2

(12) United States Patent
Olive

(10) Patent No.: US 12,490,037 B2
(45) Date of Patent: Dec. 2, 2025

(54) SYSTEMS AND METHODS FOR CALIBRATING A HEADPHONE FIXTURE

(71) Applicant: Harman International Industries, Incorporated, Stamford, CT (US)

(72) Inventor: Sean Edward Olive, Oak Park, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 434 days.

(21) Appl. No.: 18/295,597

(22) Filed: Apr. 4, 2023

(65) Prior Publication Data

US 2024/0340602 A1 Oct. 10, 2024

(51) Int. Cl.
*H04R 29/00* (2006.01)
*H04R 1/10* (2006.01)

(52) U.S. Cl.
CPC .......... *H04R 29/00* (2013.01); *H04R 1/1091* (2013.01); *H04R 2460/17* (2013.01)

(58) Field of Classification Search
CPC ... H04R 29/00; H04R 1/1091; H04R 2460/17
See application file for complete search history.

(56) References Cited

U.S. PATENT DOCUMENTS

2013/0003981 A1* 1/2013 Lane .................... H04R 29/001 381/58
2013/0216052 A1* 8/2013 Bruss .................. H04R 1/1091 381/59
2019/0080682 A1* 3/2019 Darlington .......... H04R 1/1083

FOREIGN PATENT DOCUMENTS

DE 3146706 6/1983
EP 3902287 10/2021
WO 2018009194 1/2018

OTHER PUBLICATIONS

Extended European Search Report issued in corresponding EP Application 24166276.6, issued Sep. 13, 2024, 8 pages.

* cited by examiner

*Primary Examiner* — Daniel R Sellers
(74) *Attorney, Agent, or Firm* — Burris Law, PLLC

(57) ABSTRACT

A system for calibrating a headphone fixture includes one or more headphones disposed at the headphone fixture and a controller configured to generate a test electroacoustic performance signal based on an audio signal obtained from the one or more headphones, obtain a reference electroacoustic performance signal associated with one or more test subjects and the one or more headphones, determine an electroacoustic performance difference signal based on the test electroacoustic performance signal and the reference electroacoustic performance signal, define a compensation filter based on the electroacoustic performance difference signal, and determine whether the one or more headphones satisfy a performance criteria based on one or more additional test electroacoustic performance signals and the compensation filter.

20 Claims, 7 Drawing Sheets

101-1

110

300

310b 310a

| Generic | Control | Type | Frequency | Gain | Q | Hz | Target T60 | Mode T60 | Filter T60 |
|---|---|---|---|---|---|---|---|---|---|
| 1 | Auto | PK | 39.85 | -7.7 | 1.513 | 26.3 | | 130 | 53.6 |
| 2 | Auto | PK | 82.5 | -11.0 | 1.686 | 48.9 | | 84.6 | 23.9 |
| 3 | Auto | PK | 122.5 | -8.4 | 2.447 | 50.1 | | 71.2 | 27.1 |
| 4 | Auto | PK | 1,345 | -6.4 | 1.788 | 752 | | 4.2 | 2.0 |
| 5 | Auto | PK | 2,333 | -10.5 | 2.465 | 946 | | 4.3 | 1.3 |
| 6 | Auto | PK | 2,854 | -6.3 | 4.891 | 584 | | 5.5 | 2.7 |
| 7 | Auto | PK | 6,714 | -6.9 | 4.999 | 1.34k | | 2.8 | 1.3 |
| 8 | Auto | PK | 8,235 | -28.3 | 1.000 | 8.23k | | 1.7 | - |

FIG. 3

SYSTEMS AND METHODS FOR CALIBRATING A HEADPHONE FIXTURE

FIELD

The present disclosure relates to systems and methods for calibrating a headphone fixture.

BACKGROUND

The statements in this section merely provide background information related to the present disclosure and may not constitute prior art.

Headphone fixtures are employed during various design, testing, and manufacturing phases to measure electroacoustic performance characteristics of a headphone. However, the physical characteristics of the headphone fixtures and the positioning of the headphones within or on the headphone fixtures may introduce signal errors that render the measured electroacoustic performance characteristics inaccurate.

SUMMARY

This section provides a general summary of the disclosure and is not a comprehensive disclosure of its full scope or all of its features.

The present disclosure provides a system for calibrating a headphone fixture. The system includes one or more headphones disposed at the headphone fixture and a controller configured to: generate a test electroacoustic performance signal based on an audio signal obtained from the one or more headphones, obtain a reference electroacoustic performance signal associated with one or more test subjects (or humans) and the one or more headphones, determine an electroacoustic performance difference signal based on the test electroacoustic performance signal and the reference electroacoustic performance signal, define a compensation filter based on the electroacoustic performance difference signal, and determine whether the one or more headphones satisfy a performance criteria based on one or more additional test electroacoustic performance signals and the compensation filter.

In variations of the system of the above paragraph, which may be implemented individually or in any combination: the headphone fixture is one of a flat plate fixture and a mannequin; the test electroacoustic performance signal indicates a sound intensity value associated with a plurality of frequency values of a frequency spectrum; the reference electroacoustic performance signal indicates a sound intensity value associated with a plurality of frequency values of a frequency spectrum; the reference electroacoustic performance signal is further based on one or more anthropomorphic characteristics of the one or more test subjects; the one or more anthropomorphic characteristics of the test subject include at least one of an ear-based characteristic of the one or more test subjects and a head-based characteristic of the one or more test subjects; the electroacoustic performance difference signal indicates, for each frequency value of a frequency spectrum, a sound intensity value difference between the test electroacoustic performance signal and the reference electroacoustic performance signal; the compensation filter is further based on the sound intensity value difference; and/or the compensation filter defines, for each frequency value of the frequency spectrum, a sound intensity value offset.

The present disclosure provides a method for calibrating a headphone fixture comprising one or more headphones disposed at the headphone fixture. The method includes generating a test electroacoustic performance signal based on an audio signal obtained from the one or more headphones, obtaining a reference electroacoustic performance signal associated with one or more test subjects and the one or more headphones, determining an electroacoustic performance difference signal based on the test electroacoustic performance signal and the reference electroacoustic performance signal, defining a compensation filter based on the electroacoustic performance difference signal, and determining whether the one or more headphones satisfy a performance criteria based on one or more additional test electroacoustic performance signals and the compensation filter.

In variations of the method of the above paragraph, which may be implemented individually or in any combination: the headphone fixture is one of a flat plate fixture and a mannequin; the test electroacoustic performance signal indicates a sound intensity value associated with a plurality of frequency values of a frequency spectrum; the reference electroacoustic performance signal indicates a sound intensity value associated with a plurality of frequency values of a frequency spectrum; the reference electroacoustic performance signal is further based on one or more anthropomorphic characteristics of the one or more test subjects; the one or more anthropomorphic characteristics of the test subject include at least one of an ear-based characteristic of the one or more test subjects and a head-based characteristic of the one or more test subjects; the electroacoustic performance difference signal indicates, for each frequency value of a frequency spectrum, a sound intensity value difference between the test electroacoustic performance signal and the reference electroacoustic performance signal; the compensation filter is further based on the sound intensity value difference; and/or the compensation filter defines, for each frequency value of the frequency spectrum, a sound intensity value offset.

The present disclosure provides a system for calibrating a headphone fixture. The system includes one or more headphones disposed at the headphone fixture and a controller configured to: generate a test electroacoustic performance signal based on an audio signal obtained from the one or more headphones, where the test electroacoustic performance signal indicates a test sound intensity value associated with a plurality of frequency values of a frequency spectrum, obtain a reference electroacoustic performance signal associated with one or more test subjects and the one or more headphones based on one or more anthropomorphic characteristics of the one or more test subjects, where the reference electroacoustic performance signal indicates a reference sound intensity value associated with the plurality of frequency values, determine an electroacoustic performance difference signal based on the test electroacoustic performance signal and the reference electroacoustic performance signal, where the electroacoustic performance difference signal indicates, for each frequency value of the frequency spectrum, a sound intensity value difference between the test sound intensity value and the reference sound intensity value, define a compensation filter based on sound intensity value difference associated with each frequency value of the frequency spectrum, and determine whether the one or more headphones satisfy a performance criteria based on one or more additional test electroacoustic performance signals and the compensation filter.

In variations of the system of the above paragraph, the one or more anthropomorphic characteristics of the test subject include at least one of an ear-based characteristic of the one or more test subjects and a head-based characteristic of the one or more test subjects.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 illustrates an example compensation filter in accordance with the teachings of the present disclosure;

Figure 1A:
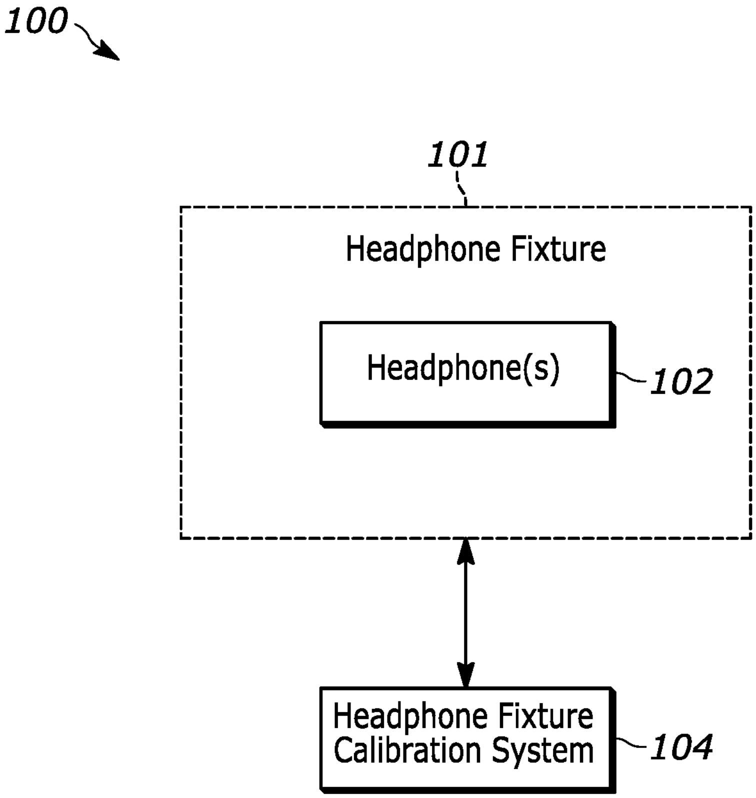
FIG. 1A illustrates an environment in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for calibrating a headphone fixture. A controller generates a test electroacoustic performance signal based on an audio signal obtained from the one or more headphones, determines an electroacoustic performance difference signal based on the test electroacoustic performance signal and a reference electroacoustic performance signal, and defines a compensation filter based on the electroacoustic performance difference signal. The controller subsequently determines whether the one or more headphones satisfy a performance criteria based on one or more additional test electroacoustic performance signals and the compensation filter. As such, the controller can accurately determine whether the performance criteria of the headphones are satisfied when it is disposed at or worn by a user. More specifically, the controller inhibits frequency response variances at given frequency bands due to varying headphone types, anthropomorphic characteristics of a test subject (or human), and/or physical characteristics of a headphone fixture.

Referring to FIG. 1A, an environment 100 is shown and generally includes a headphone fixture 101 having one or more headphones 102 disposed thereon and a headphone fixture calibration system 104. The one or more headphones 102 may be provided by various types of known headphones, such as closed-back headphones, open-back headphones, on-ear headphones, over-ear headphones, in-ear headphones, earbuds, Bluetooth® headphones, and/or noise-cancelling headphones. It should be understood that the one or more headphones 102 may be provided by other known types of headphones and are not limited to the examples described herein.

Figure 1B:
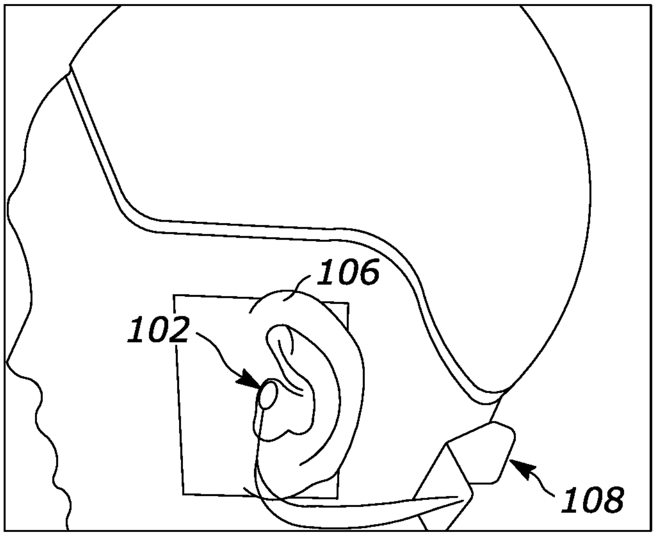
FIG. 1B illustrates an example headphone fixture in accordance with the teachings of the present disclosure.

The headphone fixture 101 may be provided various known fixtures for calibrating the headphones 102. As an example, the headphone fixture 101 is provided by a flat plate fixture having an artificial pinna on which the one or more headphones 102 are secured to during a headphone calibration routine. As another example and referring to FIG. 1B, the headphone fixture 101 is provided by a mannequin 101-1 having the one or more headphones 102 disposed at one or more artificial ears 106 of the mannequin 101-1. Furthermore, the one or more headphones 102 may be secured to the mannequin 101-1 via an attachment element 108, which may be an adhesive material or other known element configured to secure a portion of the one or more headphones 102 (e.g., one or more wires) to the mannequin 101-1.

In one embodiment, the mannequin 101-1 may have various physical characteristics that correspond to a target or desired anthropomorphic characteristics of an test subject, such as an artificial head-based characteristic (e.g., a head size, a head shape, head contours, and/or other head-based characteristics) and an artificial ear-based characteristic (e.g., ear/pinna position, ear/pinna dimensions, and/or other ear-based characteristics). As described below in further detail, the headphone fixture 101 is employed to generate test electroacoustic performance signals for calibrating the one or more headphones 102.

Figure 1C:
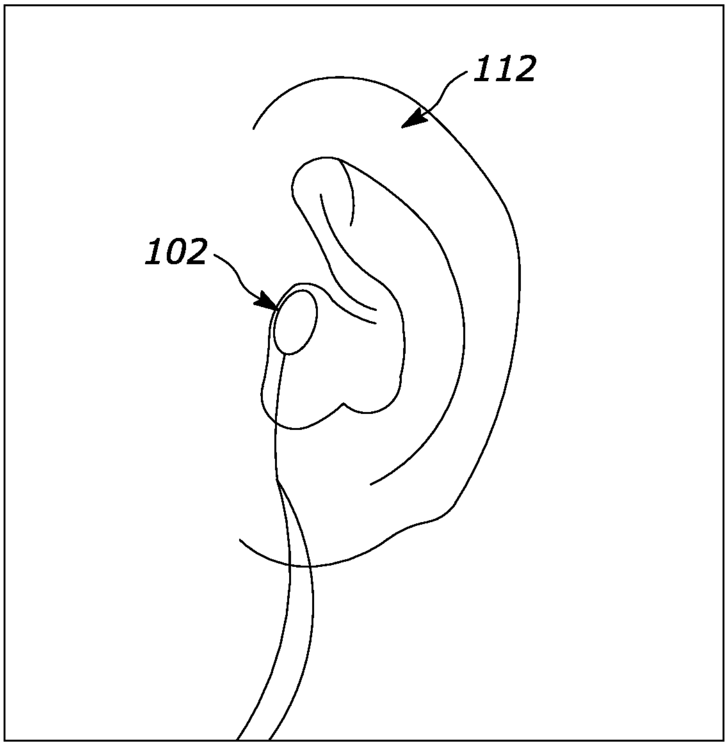
FIG. 1C illustrates a test subject in accordance with the teachings of the present disclosure.

In one variation and with reference to FIG. 1C, the headphone fixture 101 may be replaced with a test subject 110. That is, the one or more headphones 102 may be disposed at one or more ears 112 of the test subject 110 to generate the reference electroacoustic performance signals. The test subject 110 may have various anthropomorphic characteristics, such as a head-based characteristic (e.g., a head size, a head shape, head contours, and/or other head-based characteristics) and an ear-based characteristic (e.g., ear/pinna position, ear/pinna dimensions, and/or other ear-based characteristics). As described below in further detail, the test subjects 110 are employed to generate reference electroacoustic performance signals that are stored in a database of the headphone fixture calibration system 104.

Figure 2:
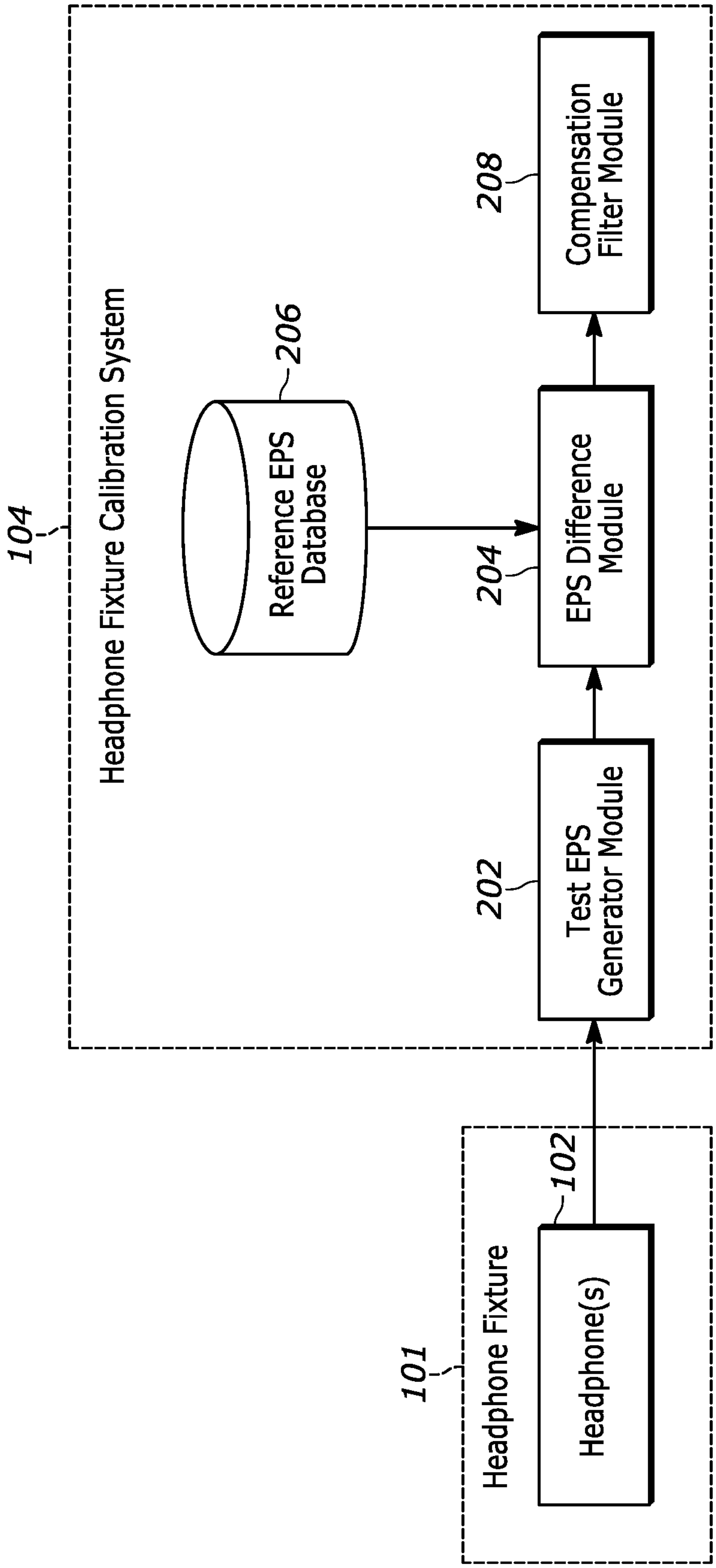
FIG. 2 illustrates a functional block diagram of a system for calibrating the headphone fixture in accordance with the teachings of the present disclosure.
Figure 4:
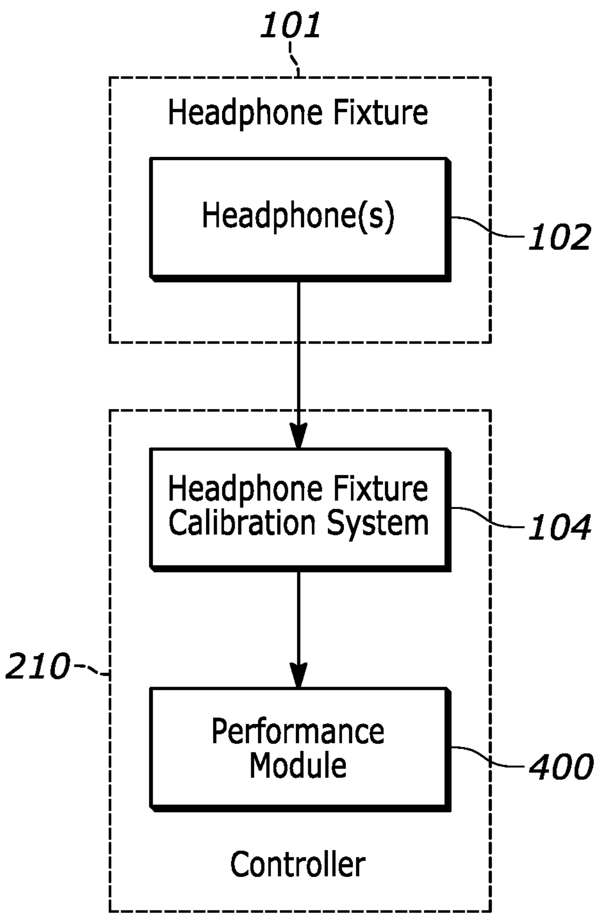
FIG. 4 illustrates a system for determining one or more electroacoustic performance characteristics of a headphone in accordance with the teachings of the present disclosure.

Referring to FIG. 2, the headphone fixture calibration system 104 generally includes a test electroacoustic performance signal (EPS) generator module 202, an EPS difference module 204, a reference EPS database 206, and a compensation filter module 208. In one form, the headphone fixture calibration system 104 may be part of a controller 210 (FIG. 4). In one form, the headphones 102 and the headphone fixture calibration system 104 are communicably coupled using a wired and/or wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one or more embodiments, the EPS generator module 202 is configured to generate a test EPS based on an audio signal obtained from the one or more headphones 102. In one or more embodiments, and the test EPS indicates, for a given audio signal sample, a plurality of sound intensity values (e.g., a decibel (dB) representation of the sound intensity values) that are correlated to a plurality of frequency values of a given frequency spectrum (e.g., 10 Hz-12 kHz).

In one or more embodiments, the EPS difference module 204 obtains a reference EPS associated with one or more test subjects 110 and the one or more headphones 102 from the reference EPS database 206. In one or more embodiments, the reference EPS is based on a reference audio signal obtained by the one or more headphones 102 when worn by or disposed at the test subject 110. Similar to the test EPS, the reference EPS indicates, for the given reference audio signal sample, a plurality of sound intensity values that are correlated to a plurality of frequency values of a given frequency spectrum.

Additionally, each reference EPS may be associated with a given type of headphones 102 and/or one or more predefined anthropomorphic characteristics of the test subjects 110, such as the head-based characteristic (e.g., a head size, a head shape, head contours, and/or other head-based characteristics) and the ear-based characteristic (e.g., ear/pinna position, ear/pinna dimensions, and/or other ear-based characteristics). Accordingly, the plurality of reference EPSs stored in the reference EPS database 206 may be associated with different headphone types, demographics, ages, genders, and other distinguishing anthropomorphic characteristics of the test subject 110 (as indicated by the head-based and ear-based characteristics). In one form, the database 206 is part of the controller 210. In other forms, the database 206 is separate from the controller 210 or remote from the controller 210 and accessed by the controller 210 using a wired and/or wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one or more embodiments, the EPS difference module 204 determines an electroacoustic performance difference signal based on the test EPS and the reference EPS. As an example, the EPS difference module 204 determines a sound intensity value difference between the test EPS and the reference EPS for each frequency value of the frequency spectrum. Additionally, the compensation filter module 208 defines a compensation filter based on the electroacoustic performance difference signal and, more particularly, the sound intensity value differences at each frequency value of the frequency spectrum.

As an example and as shown in image 300 of FIG. 3, compensation filter module 208 defines a compensation filter having a sound intensity value offset (e.g., a gain value as shown in column 310*a*) associated with each frequency value as shown in column 310*b*. That is, each sound intensity value offset may inhibit the sound intensity value differences between the test EPS and a given reference EPS. In some embodiments, the sound intensity value offsets may be defined for a set of the frequencies of the frequency spectrum (e.g., the sound intensity value offsets are defined for frequencies between 20 Hz and 12 kHz to avoid distortion and equalization errors above 12 kHz). In some embodiments, the compensation filter module 208 may define different compensation filters for various combinations of anthropomorphic characteristics and types of the one or more headphones 102.

By defining the compensation filter to minimize the sound intensity value differences between the test EPS and one or more reference EPSs, the variance in frequency responses can be inhibited. As an example, leakages associated with the one or more headphones 102 may result in a substantial variance of a portion of the EPS signal that is less than 200 Hz compared to a corresponding portion of the reference EPS that is also less than 200 Hz. As another example, substantial variances may be present at a portion of the EPS signal that is greater than 2 kHz compared to a corresponding portion of the reference EPS that is also greater than 2 kHz. As yet another example, substantial variances may be present between the test EPS and the one or more reference EPSs due to the test subjects 110 having varying anthropomorphic characteristics and/or wearing different types of headphones 102 when the reference EPSs are generated. As such, defining one or more compensation filters to accommodate for the sound intensity value differences between the test EPS of a static, non-manipulatable headphone fixture 101 and the variances of the reference EPSs described above inhibits errors induced by the headphone fixture 101 when, for example, evaluating one or more performance characteristics of the headphones 102. That is, the defined compensation filters are applied to the acoustic response measurements made on the test fixtures to remove error.

Therefore, in one or more embodiments, the controller 210 may be configured to generate a test electroacoustic performance signal based on an audio signal obtained from the one or more headphones 102, obtain a reference electroacoustic performance signal associated with one or more test subjects and the one or more headphones 102, determine an electroacoustic performance difference signal based on the test electroacoustic performance signal and the reference electroacoustic performance signal, and define a compensation filter based on the electroacoustic performance difference signal, and determine whether the one or more headphones 102 satisfy a performance criteria based on one or more additional test electroacoustic performance signals and the compensation filter. In one or more embodiments, the system 104 is a component of the controller 210 as shown in FIG. 4.

As an example, and referring to FIG. 4, the headphone fixture calibration system 104 obtains a corresponding reference EPS based on the desired anthropomorphic characteristics and the type of headphones 102 employed during a testing process of the headphones 102 disposed on the headphone fixture 101. Accordingly, the headphone fixture calibration system 104 may define a compensation filter associated to calibrate or tune one or more additional test EPSs from the headphones 102 disposed on the headphone fixture 101.

As such, a performance module 400 can accurately determine one or more performance characteristics of the headphones 102 and determine whether the headphones 102 satisfy one or more performance criterion based on the one or more additional test EPSs and the corresponding compensation filter. Example performance characteristics include, but are not limited to, a presence of leakage, audio isolation, sound quality, sound intensity values at one or more frequencies, driver characteristics, sound pressure, frequency responses, harmonic distortions, among other known performance characteristics of the headphones 102. Example performance criterion include, for a given performance characteristic, whether a value/metric is greater than or less than one or more thresholds, whether a value/metric is within a predefined tolerance/range of values, and/or whether a value/metric corresponds to a desirable or undesirable performance characteristic. The headphone 102 is measured and calibrated on the test subject and the headphone fixture 101, in one example, by a microphone placed in the entrance of an ear canal for both the test subject and the headphone fixture 101. It should be understood that the microphone does not compensate for differences in ear canals between the test subject and headphone fixture 101. However, in one example, the microphone only compensates for differences in the external ear and its acoustical interactions with the headphone 102.

Figure 5A:
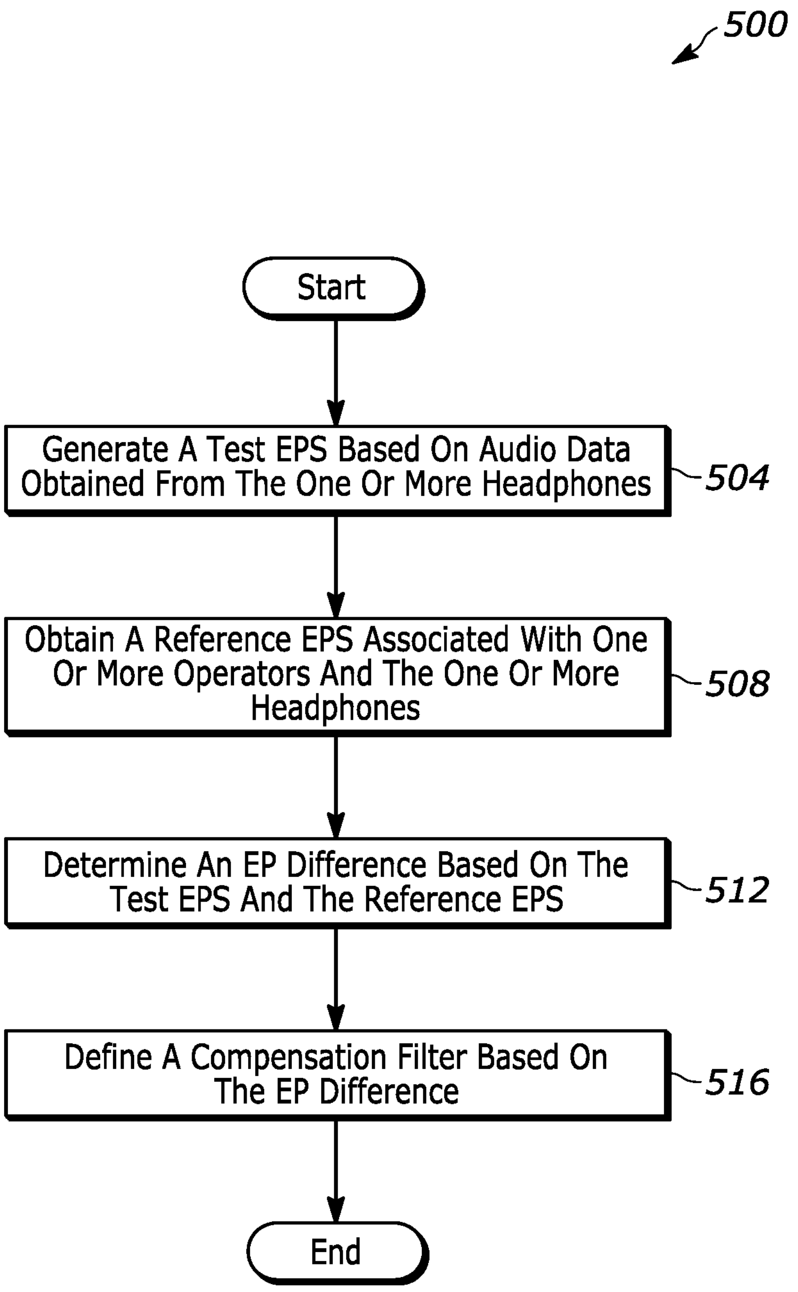
FIG. 5A is a flowchart illustrating an example routine for calibrating the headphone fixture in accordance with the teachings of the present disclosure.

Referring to FIG. 5A, a routine 500 for calibrating the headphone fixture 101 is shown. At 504, the headphone fixture calibration system 104 generates a test EPS based on audio data obtained from the one or more headphones 102, and the headphone fixture calibration system 104 obtains a reference EPS associated with the one or more given test subjects 110 and/or the headphones 102 in which calibration is desired at 508. At 512, the headphone fixture calibration system 104 determines an EP difference based on the test EPS and the reference EPS and defines a compensation filter based on the EP difference at 516.

Figure 5B:
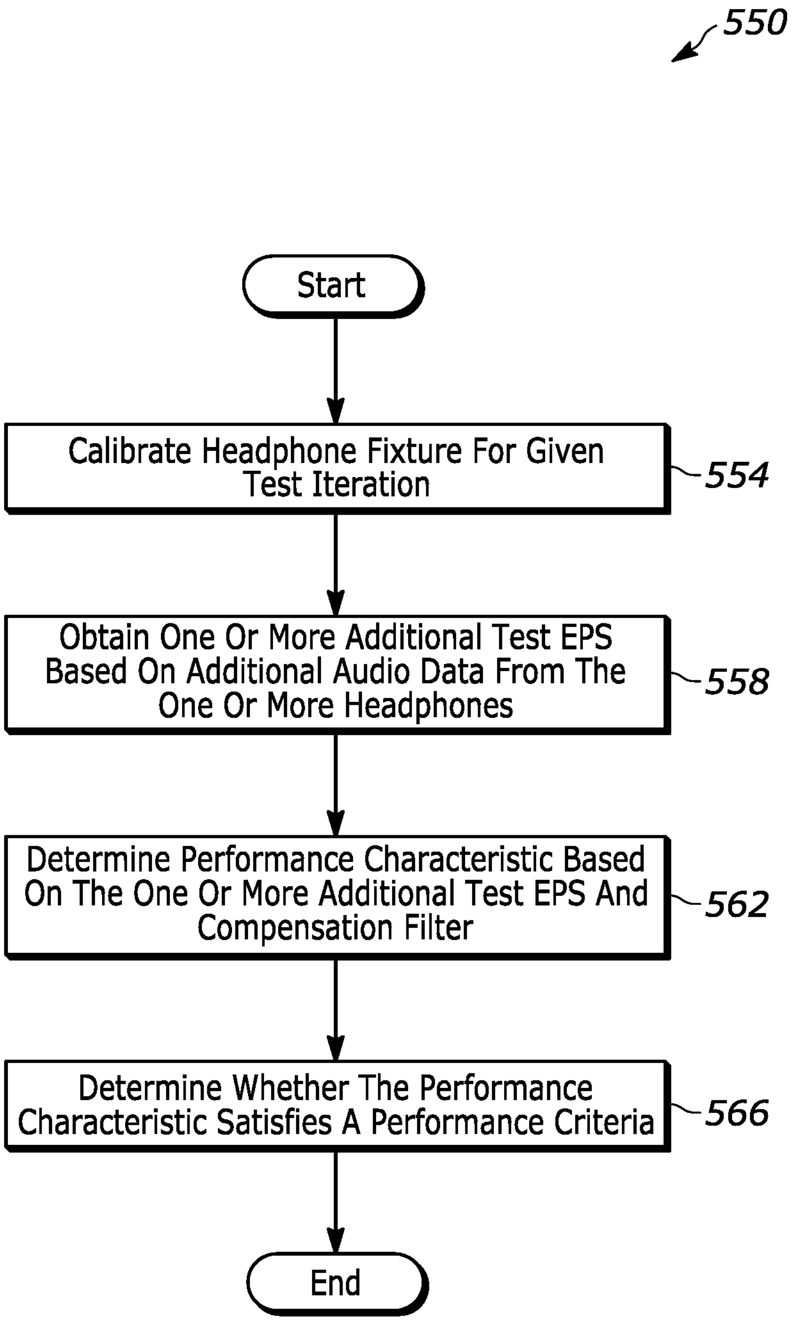
FIG. 5B is a flowchart illustrating an example routine for determining a performance characteristic of a headphone in accordance with the teachings of the present disclosure.

Referring to FIG. 5B, a routine 550 for evaluating a performance characteristic of the headphones 102 is shown. At 554, the headphone fixture calibration system 104 calibrates the headphone fixture 101 for a given test iteration (e.g., a given type of headphones 102 and/or predefined anthropomorphic characteristics of the test subject 110) by, for example, performing the routine 500 described above with reference to FIG. 5A. At 558, and in response to calibrating the headphone fixture 101, the headphone fixture calibration system 104 obtains one or more additional test EPS based on additional audio data from the one or more headphones 102. At 562, the performance module 400 determines a performance characteristic based on the one or more additional test electroacoustic performance signals and the compensation filter employed by the headphone fixture calibration system 104. At 566, the performance module 400 determines whether the performance characteristic satisfies a performance criteria, and the routine 550 ends.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for calibrating a headphone fixture, the system comprising:

one or more headphones disposed at the headphone fixture; and a controller configured to:

generate a test electroacoustic performance signal based on an audio signal obtained from the one or more headphones;

obtain a reference electroacoustic performance signal associated with one or more test subjects and the one or more headphones;

determine an electroacoustic performance difference signal based on the test electroacoustic performance signal and the reference electroacoustic performance signal;

define a compensation filter based on the electroacoustic performance difference signal; and determine whether the one or more headphones satisfy a performance criteria based on one or more additional test electroacoustic performance signals and the compensation filter.

2. The system of claim 1, wherein the headphone fixture is one of a flat plate fixture and a mannequin.

3. The system of claim 1, wherein the test electroacoustic performance signal indicates a sound intensity value associated with a plurality of frequency values of a frequency spectrum.

4. The system of claim 1, wherein the reference electroacoustic performance signal indicates a sound intensity value associated with a plurality of frequency values of a frequency spectrum.

5. The system of claim 1, wherein the reference electroacoustic performance signal is further based on one or more anthropomorphic characteristics of the one or more test subjects.

6. The system of claim 5, wherein the one or more anthropomorphic characteristics of the test subject include at least one of an ear-based characteristic of the one or more test subjects and a head-based characteristic of the one or more test subjects.

7. The system of claim 1, wherein the electroacoustic performance difference signal indicates, for each frequency value of a frequency spectrum, a sound intensity value difference between the test electroacoustic performance signal and the reference electroacoustic performance signal.

8. The system of claim 7, wherein the compensation filter is further based on the sound intensity value difference.

9. The system of claim 8, wherein the compensation filter defines, for each frequency value of the frequency spectrum, a sound intensity value offset.

10. A method for calibrating a headphone fixture comprising one or more headphones disposed at the headphone fixture, the method comprising:

- generating a test electroacoustic performance signal based on an audio signal obtained from the one or more headphones;
- obtaining a reference electroacoustic performance signal associated with one or more test subjects and the one or more headphones;
- determining an electroacoustic performance difference signal based on the test electroacoustic performance signal and the reference electroacoustic performance signal;
- defining a compensation filter based on the electroacoustic performance difference signal; and
- determining whether the one or more headphones satisfy a performance criteria based on one or more additional test electroacoustic performance signals and the compensation filter.

11. The method of claim 10, wherein the headphone fixture is one of a flat plate fixture and a mannequin.

12. The method of claim 10, wherein the test electroacoustic performance signal indicates a sound intensity value associated with a plurality of frequency values of a frequency spectrum.

13. The method of claim 10, wherein the reference electroacoustic performance signal indicates a sound intensity value associated with a plurality of frequency values of a frequency spectrum.

14. The method of claim 10, wherein the reference electroacoustic performance signal is further based on one or more anthropomorphic characteristics of the one or more test subjects.

15. The method of claim 10, wherein the one or more anthropomorphic characteristics of the test subject include at least one of an ear-based characteristic of the one or more test subjects and a head-based characteristic of the one or more test subjects.

16. The method of claim 10, wherein the electroacoustic performance difference signal indicates, for each frequency value of a frequency spectrum, a sound intensity value difference between the test electroacoustic performance signal and the reference electroacoustic performance signal.

17. The method of claim 16, wherein the compensation filter is further based on the sound intensity value difference.

18. The method of claim 17, wherein the compensation filter defines, for each frequency value of the frequency spectrum, a sound intensity value offset.

19. A system for calibrating a headphone fixture, the system comprising:

- one or more headphones disposed at the headphone fixture; and
- a controller configured to:
  - generate a test electroacoustic performance signal based on an audio signal obtained from the one or more headphones, wherein the test electroacoustic performance signal indicates a test sound intensity value associated with a plurality of frequency values of a frequency spectrum;
  - obtain a reference electroacoustic performance signal associated with one or more test subjects and the one or more headphones based on one or more anthropomorphic characteristics of the one or more test subjects, wherein the reference electroacoustic performance signal indicates a reference sound intensity value associated with the plurality of frequency values;
  - determine an electroacoustic performance difference signal based on the test electroacoustic performance signal and the reference electroacoustic performance signal, wherein the electroacoustic performance difference signal indicates, for each frequency value of the frequency spectrum, a sound intensity value difference between the test sound intensity value and the reference sound intensity value;
  - define a compensation filter based on sound intensity value difference associated with each frequency value of the frequency spectrum; and
  - determine whether the one or more headphones satisfy a performance criteria based on one or more additional test electroacoustic performance signals and the compensation filter.

20. The system of claim 19, wherein the one or more anthropomorphic characteristics of the test subject include at least one of an ear-based characteristic of the one or more test subjects and a head-based characteristic of the one or more test subjects.

* * * * *